United States Patent

Wagner et al.

(10) Patent No.: US 10,393,446 B2
(45) Date of Patent: Aug. 27, 2019

(54) CAPILLARY HEAT EXCHANGER

(71) Applicants: Andrew L. Wagner, King George, VA (US); Steven W. Price, Fredericksburg, VA (US)

(72) Inventors: Andrew L. Wagner, King George, VA (US); Steven W. Price, Fredericksburg, VA (US)

(73) Assignee: The United States of America as represented by the Secretary of the Navy

( * ) Notice: Subject to any disclaimer, the term of this patent is extended or adjusted under 35 U.S.C. 154(b) by 265 days.

(21) Appl. No.: 15/459,173

(22) Filed: Mar. 15, 2017

(65) Prior Publication Data

US 2018/0266770 A1    Sep. 20, 2018

(51) Int. Cl.
| | |
|---|---|
| F28D 3/00 | (2006.01) |
| F28D 7/00 | (2006.01) |
| F28F 7/02 | (2006.01) |
| B33Y 80/00 | (2015.01) |
| B22F 3/105 | (2006.01) |
| B22F 5/10 | (2006.01) |

(52) U.S. Cl.
CPC ............ *F28D 7/0025* (2013.01); *B33Y 80/00* (2014.12); *F28F 7/02* (2013.01); *B22F 3/1055* (2013.01); *B22F 5/10* (2013.01); *F28F 2255/18* (2013.01); *F28F 2260/02* (2013.01)

(58) Field of Classification Search
CPC .. F28F 7/02; F28D 7/0008; F28D 7/00; F28D 7/1653
USPC .................................................. 164/164, 165
See application file for complete search history.

(56) References Cited

U.S. PATENT DOCUMENTS

| | | | | |
|---|---|---|---|---|
| 4,421,702 A | * | 12/1983 | Oda | F28F 7/02 |
| | | | | 264/209.8 |
| 5,725,051 A | * | 3/1998 | Veltkamp | F28F 21/06 |
| | | | | 165/164 |
| 6,896,043 B2 | * | 5/2005 | Dunn | F28D 9/0062 |
| | | | | 165/165 |
| 8,851,156 B2 | * | 10/2014 | Semmes | F28F 19/006 |
| | | | | 165/134.1 |
| 2004/0261379 A1 | * | 12/2004 | Bruun | F23C 13/00 |
| | | | | 55/418 |

(Continued)

*Primary Examiner* — Davis D Hwu
(74) *Attorney, Agent, or Firm* — Gerhard W. Thielman, Esq.

(57) ABSTRACT

A honeycomb device is provided for heat exchange between first and second fluids at distinguishable temperatures. The device includes first and second fluid intakes, first and second fluid exhausts, first and second capillary arrays, and first, second, third and fourth channels. The first and second fluid intakes respectively receive the first and second fluids. The first and second fluid exhausts respectively discharge the first and second fluids. Each first and second capillary in the arrays are disposed in checkerboard cross-section adjacent arrangement, and preferably have a rhombus cross-section. The first transition channel connects the first fluid intake to the first capillary array. The second transition channel connects the first capillary array to the first fluid exhaust. The third transition channel connects the second fluid intake to the second capillary array. The fourth transition channel connects the second capillary array to the second fluid exhaust.

3 Claims, 3 Drawing Sheets

(56) References Cited

U.S. PATENT DOCUMENTS

| | | | | |
|---|---|---|---|---|
| 2006/0245987 A1* | 11/2006 | Schmidt | ............... | B01J 19/0093 422/198 |
| 2013/0174924 A1* | 7/2013 | Luo | ....................... | F28F 9/0221 137/561 A |
| 2013/0206374 A1* | 8/2013 | Roisin | ..................... | B22F 7/002 165/165 |
| 2017/0045313 A1* | 2/2017 | Fennessy | .................. | F28F 9/00 |

\* cited by examiner

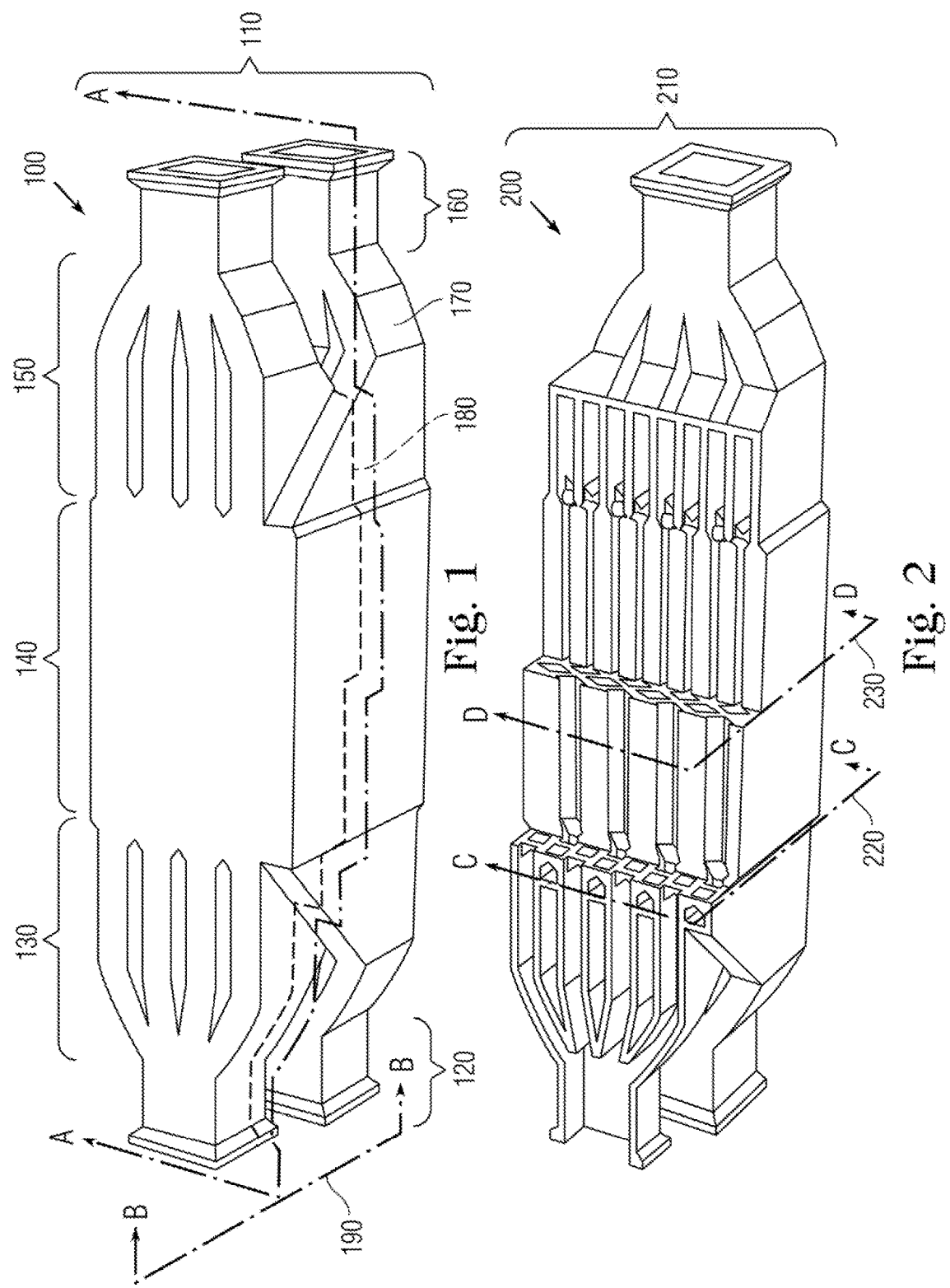

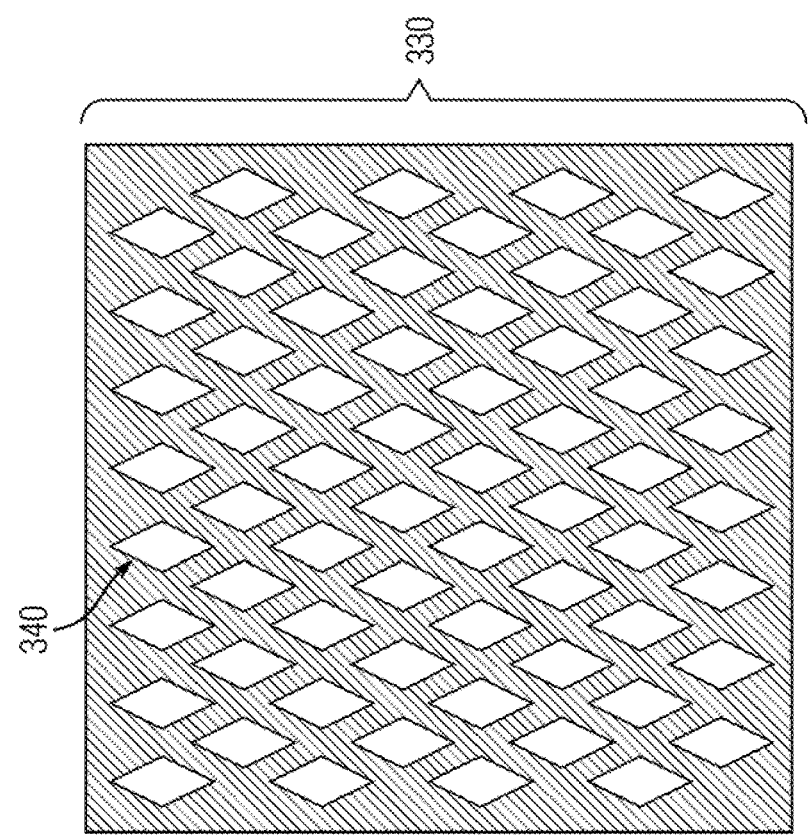
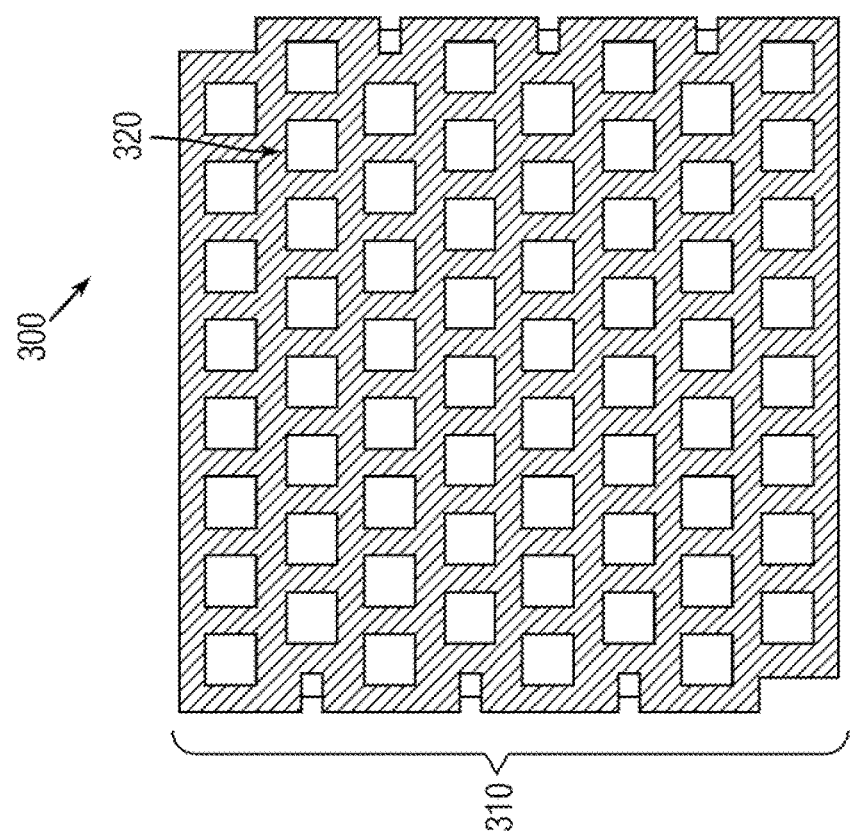

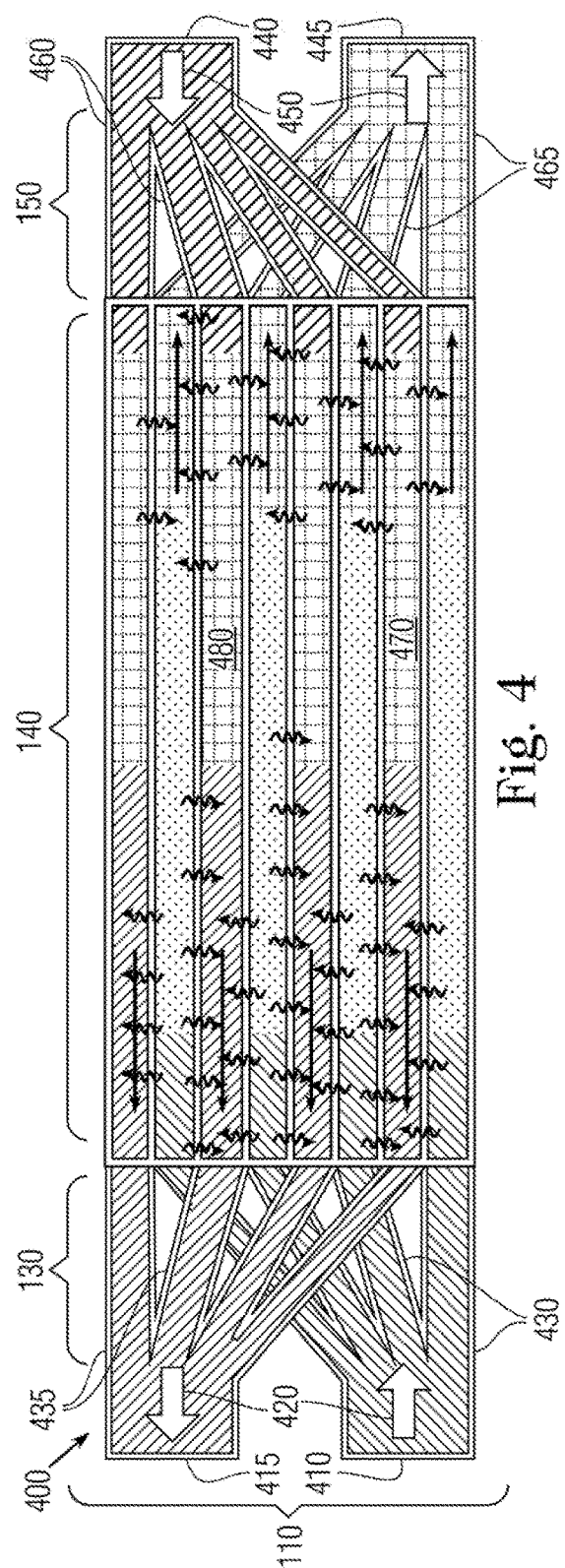
Fig. 4
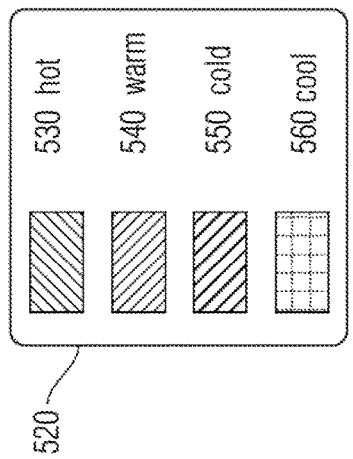
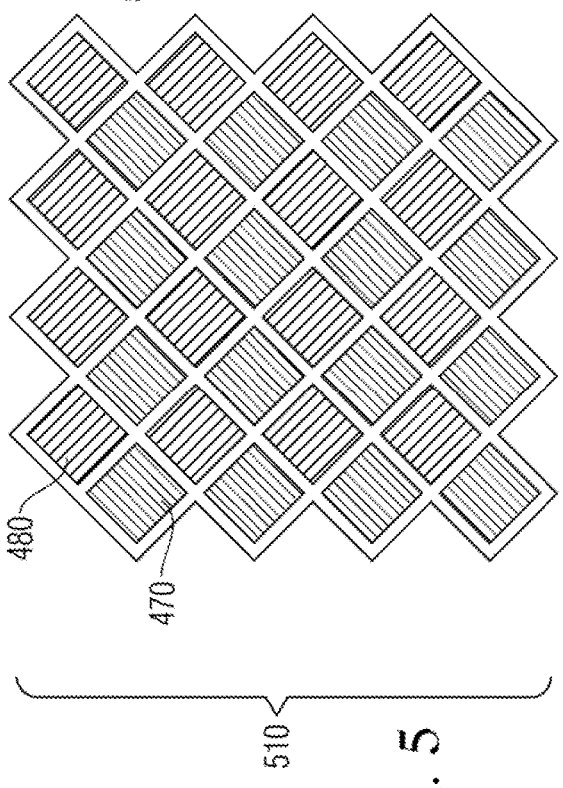
Fig. 5

CAPILLARY HEAT EXCHANGER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to heat exchangers. In particular, the invention relates to a throughput device using a mesh of capillaries separated by adjacent walls to facilitate heat transfer.

SUMMARY

Conventional heat exchangers yield disadvantages addressed by various exemplary embodiments of the present invention. In particular, various exemplary embodiments provide a honeycomb device for heat exchange between first and second fluids at distinguishable temperatures. The device includes first and second fluid intakes, first and second fluid exhausts, first and second capillary arrays, and first, second, third and fourth channels. The first and second fluid intakes respectively receive the first and second fluids. The first and second fluid exhausts respectively discharge the first and second fluids.

In exemplary embodiments, each first and second capillary in the arrays are disposed in checkerboard cross-section adjacent arrangement, and preferably have a diagonal square cross-section. The first transition channel connects the first fluid intake to the first capillary array. The second transition channel connects the first capillary array to the first fluid exhaust. The third transition channel connects the second fluid intake to the second capillary array. The fourth transition channel connects the second capillary array to the second fluid exhaust.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a perspective view of an exemplary capillary heat exchanger;

FIG. 2 is a perspective cutaway view of the heat exchanger;

FIGS. 3A and 3B are axial cross-section views of the heat exchanger;

FIG. 4 is an elevation cross-section view of the heat exchanger; and

FIG. 5 is a cross-section diagram view of a heat exchanger mesh.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows a perspective view 100 of an exemplary capillary heat exchanger 110 as a mesh configuration. A distal plenum 120 provides heated fluid passages. A distal manifold 130 transitions multiple channels and the heated fluid passages. A thermal interchange 140 enables heat transfer between adjacent conduits.

A proximal manifold 150 transitions multiple channels and cooled fluid passages. A proximal plenum 160 provides cooled fluid passages. A lateral cut-plane 170 along line A-A presents a cutaway perimeter 180 for the heat exchanger 110. This cut-plane 170 includes elevation shifts in the interchange 140 and the distal manifold 130. An elevation cut-plane 190 along line B-B presents a cross-section for the heat exchanger 110.

FIG. 2 shows a perspective cutaway view 200 of the heat exchanger 110 along the A-A cut-plane 170 to reveal internal geometry 210. The elevation shifts along the perimeter 180 correspond to a manifold axial cross-section plane 220 along line C-C and an interchange axial cross-section plane 230 along line D-D. The fluid flow spaces shown in the cutaway view 200 denote mechanical connections to enable fluid transport across the heat exchanger 110 between the plenums 120 and 160.

FIGS. 3A and 3B show axial cross-sectional views 300 of the manifold plane 220 as manifold cutaway face 310 with staggered rectangular or square cross-section channels 320 and the interchange plane 230 as transition cutaway face 330 with rhombus (or diamond) cross-section conduits 340 called capillaries. The square channels 320 align with corresponding rhombus conduits 340 along the manifold plane 220. The comparatively thick walls for conduits 340 constitute a manifestation of the fabrication techniques employed for producing a prototype design, rather than an intended feature.

Pressure drop may result due to corner losses from the shape transition in cross-section from square channels 320 to rhombus conduits 340, as well as increased wall surface friction from subdivision into channels. Such conditions may necessitate increase of pressure differential driven by pumps or fans depending on the physical nature of the fluid being transported in either direction. In select cases, only one direction may necessitate pressurized pull or push by mechanical devices.

FIG. 4 shows an elevation cross-section view 400 of the heat exchanger 110. The distal plenum 120 includes a hot fluid entrance 410 and a warm fluid exhaust 415, with heated-fluid directions 420 indicated. Hot fluid received from the entrance 410 subdivides into the distal manifold 130 through hot channels 430. Warm fluid from the interchange 140 recombines into the distal manifold 130 through warm channels 435 for discharge through the exhaust 415.

The proximal chamber 160 includes a cold fluid entrance 440 and a cool fluid exhaust 445, with cooled-fluid directions 450 indicated to and from the proximal manifold 150. Cold fluid received from the entrance 440 subdivides into the proximal manifold 150 through cold channels 460. Cool fluid from the interchange 140 recombines into the proximal manifold 150 through cool channels 465 for discharge through the exhaust 445.

The interchange 140 includes heater fluid capillaries 470 and adjacent cooler fluid capillaries 480, each with conduit cross-sections 340. The heater capillaries 470 connect flow passage between hot channels 430 in the distal manifold 130 and cool channels 465 in the proximal manifold 150. The cooler fluid capillaries 480 connect flow passage between cold channels 460 in the proximal manifold 150 and warm channels 435 in the distal manifold 130.

The fluid flow transport and thermal energy transfer directions are respectively indicated by straight arrows and squiggly arrows. Thermal energy passes from the heater capillaries 470 to the adjacent cooler capillaries 480 by conduction through adjacent walls as their respective fluids pass each other in opposite directions along their flow conduits.

FIG. 5 shows a geometric conceptual view 500 of the diamond conduit pattern 510 (not to scale). The conduits 340 are arranged as a checkerboard to include heater fluid capillaries 470 and cooler fluid capillaries 480. A legend 520 identifies the shading for respective portions in view 400, including hot 530, warm 540, cold 550 and cool 560. The opposing capillaries 470 and 480 are depicted in view 400 as interleaving stacks, but should more properly be considered as a checkerboard from axial cross-section in view 500.

Various exemplary embodiments provide an effective heat transfer mechanism for outgoing hot fluid flows in the opposite direction of incoming cold fluids via adjacent tubes. The hot fluid continuously cools as while transferring thermal energy to the incoming cold fluid. In the same way the incoming cold fluid continues to pass, and hence receive thermal energy, from increasingly warmer opposing fluid. A checkerboard pattern 510 maximizes interface surface area between hot and cold fluids supplied from their respective entrances 410 and 440.

The exemplary configurations described provide various advantages over conventional designs, such as exchanging gas or liquid between two environments while minimizing heat transfer, such as replacing stale indoor air with fresh outside air without altering the interior temperature. Alternatively, several thermal convection 'capillary' conduits carry outgoing fluids past adjacent incoming 'capillary' conduits. This enables heat from fluids traveling in a transport direction to effectively transfer to fluids going the opposite transport direction driven by their temperature differences.

Additionally, these exemplary configurations also enable use of seawater to cool freshwater for cooling shipboard equipment. These configurations can also reduce the heat signature from a ship's exhaust while improving engine efficiency. Such configurations can also be used for residential and commercial heating, ventilating and air-conditioning (HVAC) applications for installation in houses and business to provide fresh air inside a building, e.g., athletic facilities, automotive repair garages, factories, and to recapture heat lost through bathroom and kitchen exhausts.

The concept developed from lifeguard duty at an indoor swimming pool by which one inventor would occasionally be overcome by the chlorine in the air of the pool room. However in winter, doors or windows could not be opened to avoid chilling patrons, inspiring development of a heat transfer configuration to facilitate reception of unvitiated external air while minimizing internal temperature change.

Presenters at the Print-a-Thon at Naval Surface Warfare Center—Dahlgren Division mentioned advantages of three-dimensional (3D) printers for producing honeycomb and other similar structures that otherwise couldn't be machined or manufactured readily. The exemplary embodiments are based on bird's capillary system in their legs—this system captures the heat from the blood in the arteries entering the legs to reheat the blood in the veins returning to the body.

Capillary conduits 340 are represented as a checkerboard honeycomb pattern 510 of thin rhombus pipes. The challenge involves transferring the liquid or gas from ordinary ducting or plumbing pipes into alternating squares of this lattice, to maximize surface area between distinct temperatures.

Outbound fluid (liquid or gas) is innovatively distributed from a intake passage 410 or 440 into alternating capillaries 470 or 480, so that each side of each pipe is in contact with fluid from an outbound passage 445 or 415. Thermal energy transfers as the fluids from their respective capillaries 470 and 480 pass each other. The honeycomb pattern 510 of rhombus conduits 340 in the interchange 140 is combined through the unique transport consolidation system to the channels 320 in the manifolds 130 and 150.

When the fluid leaves the respective exhaust passages 415 and 445, the temperatures in both exhausts will be closer to that of the average, and hence that in the interior of the exhaust space than that delivered by the intake passages 410 and 440. The distribution geometry of the distal manifold 130 divides the heater outbound and inbound channels 430 and 435 into several flattened rectangular cross-section tubes, which are then widened and alternately stacked into square cross-section conduits 340.

Similarly, the distribution geometry of the proximal manifold 150 divides the cooler outbound and inbound channels 460 and 465 into several flattened rectangular cross-section tubes, which are then widened and alternately stacked into square cross-section conduits 340. The fluid contained within the rightward flowing passages 410 and 445 coupled by warm capillaries 470 is independent of and can be isolated from the leftward flowing passages 415 and 440 coupled by cool capillaries 480. Artisans of ordinary skill will recognize that the comparative terms "warm" and "cool" in this context mean in relation to their counterpart flow (i.e., "warm" having a higher temperature than "cool"), rather than with the surrounding environment.

The respective fluids between these thermally isolated fluid transport mechanisms can be materially and mechanically distinct from each other. For heat transfer purposes, the temperatures of the respective fluids differ to drive thermal conductivity. Their material distinction can be manifest by differing chemical properties. Their mechanical distinction can arise from differences in thermodynamic phase (e.g., liquid, gas, plasma) and associated accommodations for inducing pressure differences across the transport routes. The mechanical properties of the fluid can depend on its compressibility, density, viscosity, heat capacity, thermal conductivity and related material qualities.

Between the distal section 120 and the interchange 140 is disposed the distal manifold 130 that divides hot fluid intake from entrance passage 410 to channels 430, and combines warm fluid outbound from channels 435 to exhaust passage 415. Similarly, between the proximal section 160 and the interchange 140 is disposed the proximal manifold 150 that divides cold fluid intake from entrance passage 440 to channels 460, and combines cool fluid outbound from channels 465 to exhaust passage 445.

As shown in channel face 310, the outbound rows of square cross-sections 320 for channels 430 and 460 are offset slightly from the inbound square cross-sections for channels 435 and 465. From the manifolds 130 and 150, the square cross-sections 320 are then twisted and extended into diamond forms 340, so that each side wall of a warm capillary 470 conductively touches the flanking row of an adjacent cool capillary 480 below or above, and vice versa.

For purposes involving the inspired purpose for delivering into a room fresh air from outside warmed by the exemplary heat exchanger 110, exhaust fans for a bathroom or clothes dryer could have four-inch diameter ducting (with 81 cm$^2$), while return air at lower pressure could be six-inch square ducting (with 232 cm$^2$). The capillaries 470 and 480 could be composed of corrugated sheet metal (e.g., aluminum, galvanized steel or stainless steel). The channels 430, 435, 460 and 465 having complicated geometries, could be fabricated by large 3-D printers from durable and non-corrosive material and fastened to their respective passages 410, 415, 440 and 445, and the sets of capillaries 470 and 480.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A honeycomb device for heat exchange between first and second fluids at distinguishable temperatures, said device comprising:

first and second fluid intakes for respectively receiving the first and second fluids;

first and second fluid exhausts for respectively discharging the first and second fluids;

first and second capillary arrays, each first and second capillary of said arrays being disposed in checkerboard cross-section adjacent arrangement;

a first plurality of transition channels that connects said first fluid intake to said first capillary array;

a second plurality of transition channels that connects said first capillary array to said first fluid exhaust;

a third plurality of transition channels that connects said second fluid intake to said second capillary array; and a fourth plurality of transition channels that connects said second capillary array to said second fluid exhaust, wherein each capillary of said arrays has a rhombus cross-section, each transition channel of said pluralities has a rectangular cross-section, and said transition channels twistingly connect to corresponding said arrays to accommodate said respective rectangular and rhombus cross-sections.

2. The device according to claim 1, wherein said rhombus cross-section forms a diagonal square for said each capillary.

3. The device according to claim 1, wherein said first and fourth pluralities of transition channels form a first manifold, and said second and third pluralities of transition channels form a second manifold.

* * * * *